Aug. 11, 1970 C. L. TAYLOR ETAL 3,523,410
APPARATUS FOR MOWING, CONDITIONING AND WINDROWING FORAGE
Filed April 26, 1968 4 Sheets-Sheet 1
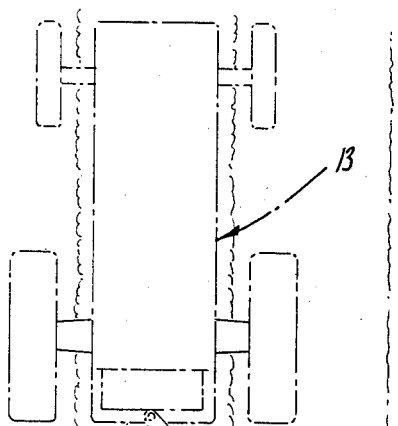
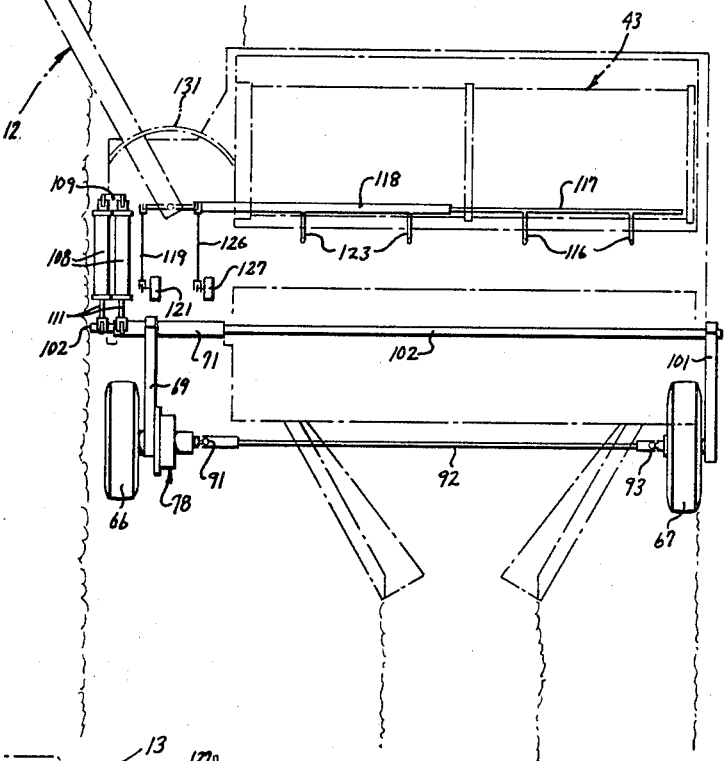
INVENTOR.
Clyde L. Taylor
BY William E. Hamel
Attorneys

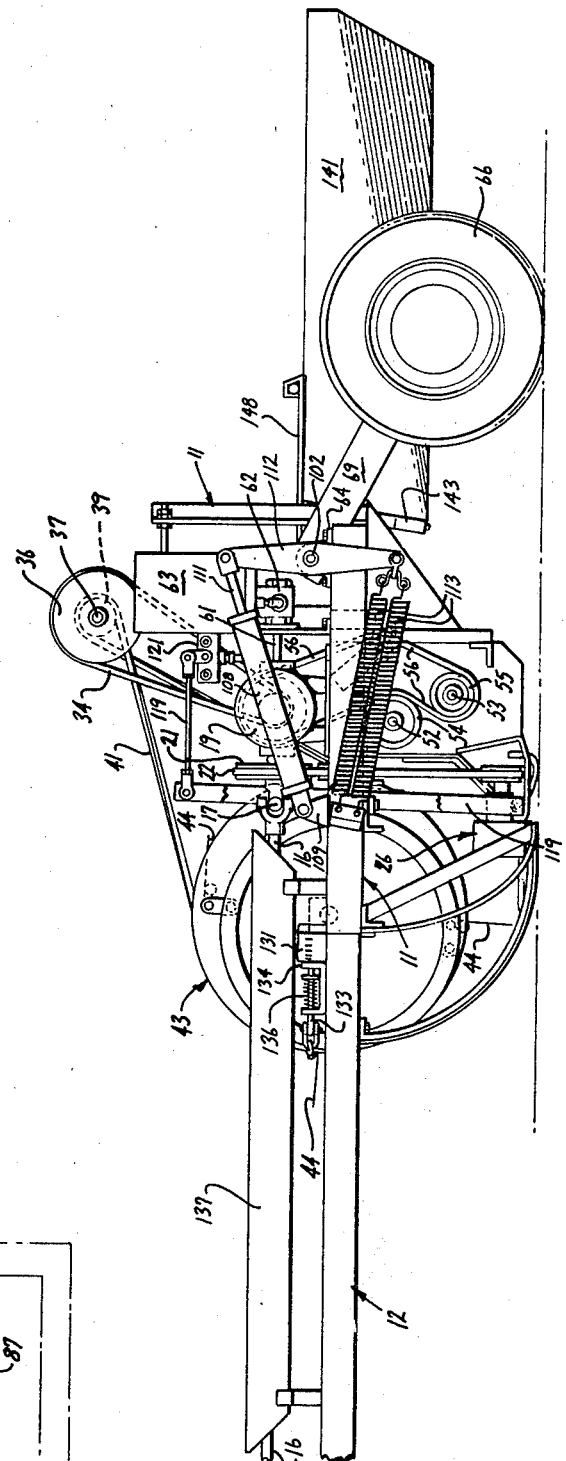

INVENTOR.
Clyde L. Taylor
BY William E. Hamel
Attorneys

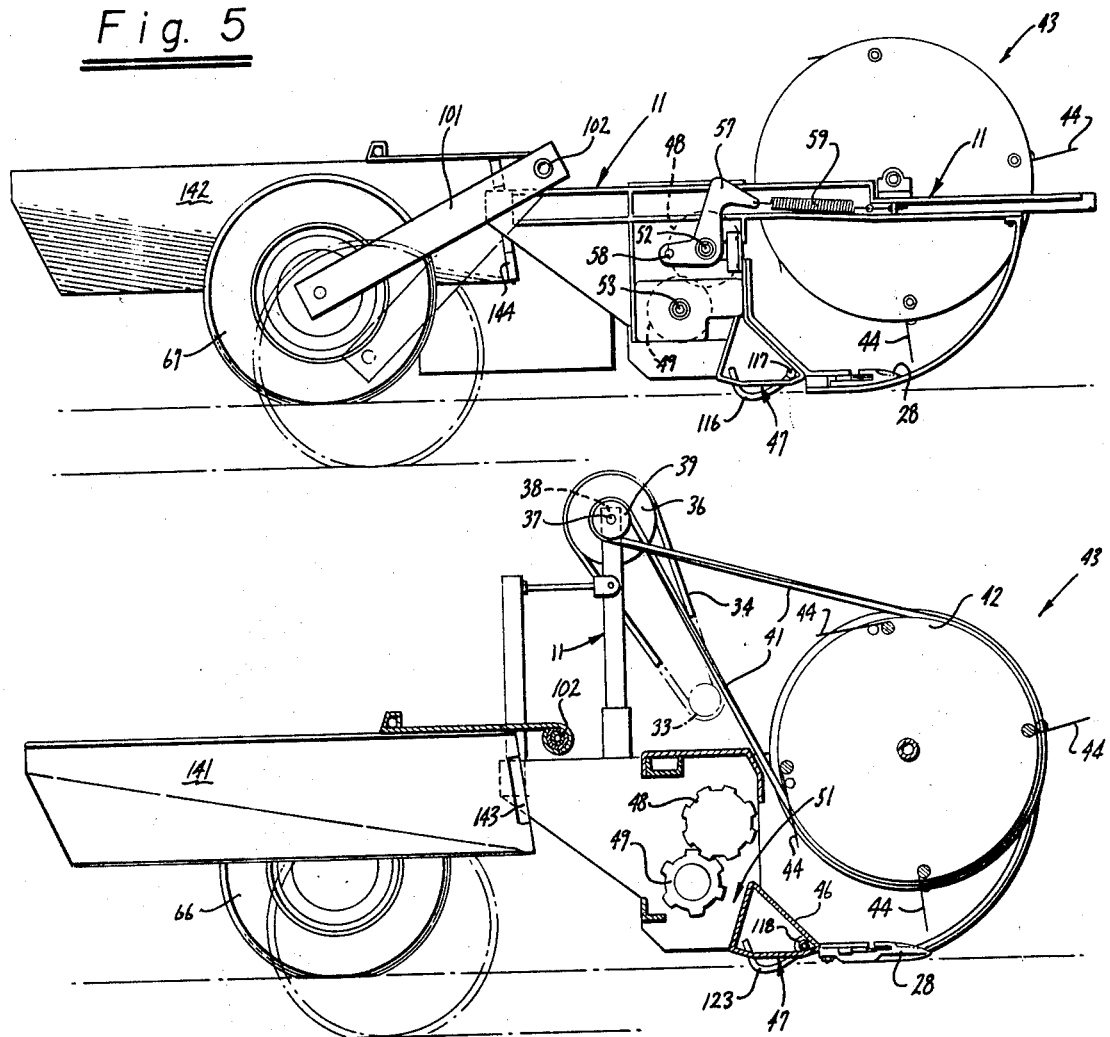

3,523,410
APPARATUS FOR MOWING, CONDITIONING
AND WINDROWING FORAGE
Clyde L. Taylor, 1545 S. Chinowith St., Visalia, Calif.
93277, and William Ernest Hamel, 718 Madera St., Dos
Palos, Calif. 93620
Filed Apr. 26, 1968, Ser. No. 724,468
Int. Cl. A01d 43/10
U.S. Cl. 56—23                                  5 Claims

ABSTRACT OF THE DISCLOSURE

Apparatus for mowing, conditioning and windrowing of forage which is hydraulically controlled and which has means to prevent it from canting sideways while being towed by the use of ground engaging wheels of different sizes interconnected by an adjustable slip clutch.

BACKGROUND OF THE INVENTION

Forage windrowers and conditioners have heretofore been provided which are of the type which can be pulled behind a tractor. However, such apparatus has a disadvantage in that in order to prevent the prime mover or tractor which is pulling the apparatus from running over the forage to be cut, it has been necessary to pull the apparatus from one side and thus the apparatus has a tendency to cant sideways towards the rear of the tractor. There is, therefore, a need for a new and improved apparatus which can be utilized for mowing, conditioning and windrowing forage.

SUMMARY OF THE INVENTION AND OBJECTS

The apparatus for mowing, conditioning and windrowing forage consists of an elongate framework. Towing means is generally secured to one end of the framework and is adapted to be secured to the tractor for pulling the apparatus. A pair of spaced ground engaging wheels are secured to the frame so that they rotate on an axis transverse of the direction in which the framework is to be pulled. The wheel farthest from the towing means has a diameter which is slightly larger than the diameter of the other wheel. Means including a clutch means is provided for interconnecting the wheels. The clutch means is adjusted to permit slippage upon a predetermined force being applied to the clutch means so that the framework is not canted and is maintained in a position substantially at right angles to the direction it is being pulled.

In general it is an object of the present invention to provide apparatus for mowing, conditioning and windrowing forage which will not cant sideways while it is being pulled through the field.

Another object of the invention is to provide apparatus of the above character which is hydraulically driven.

Another object of the invention is to provide apparatus of the above character which is easily operated and which can be readily and economically constructed.

Additional objects and features of the invention will appear from the following description in which the preferred embodiment is set forth in detail in conjunction with the accompanying drawing.

BRIEF DESCRIPTION OF THE DRAWING

FIG. 1 is a top plan view of an apparatus for mowing, conditioning and windrowing incorporating the present invention showing the same being pulled by a tractor;

FIG. 2 is a rear elevational view of the apparatus shown in FIG. 1;

FIG. 3 is a side elevational view looking at the left side of the apparatus shown in FIG. 1;

FIG. 5 is a side elevational view of the right-hand side of the apparatus shown in FIG. 1;

FIG. 6 is a cross-sectional view taken along the line 6—6 of FIG. 4;

FIG. 7 is an enlarged cross-sectional view of the clutch mechanism shown in FIG. 4.

DESCRIPTION OF THE PREFERRED EMBODIMENT

Figure 4:
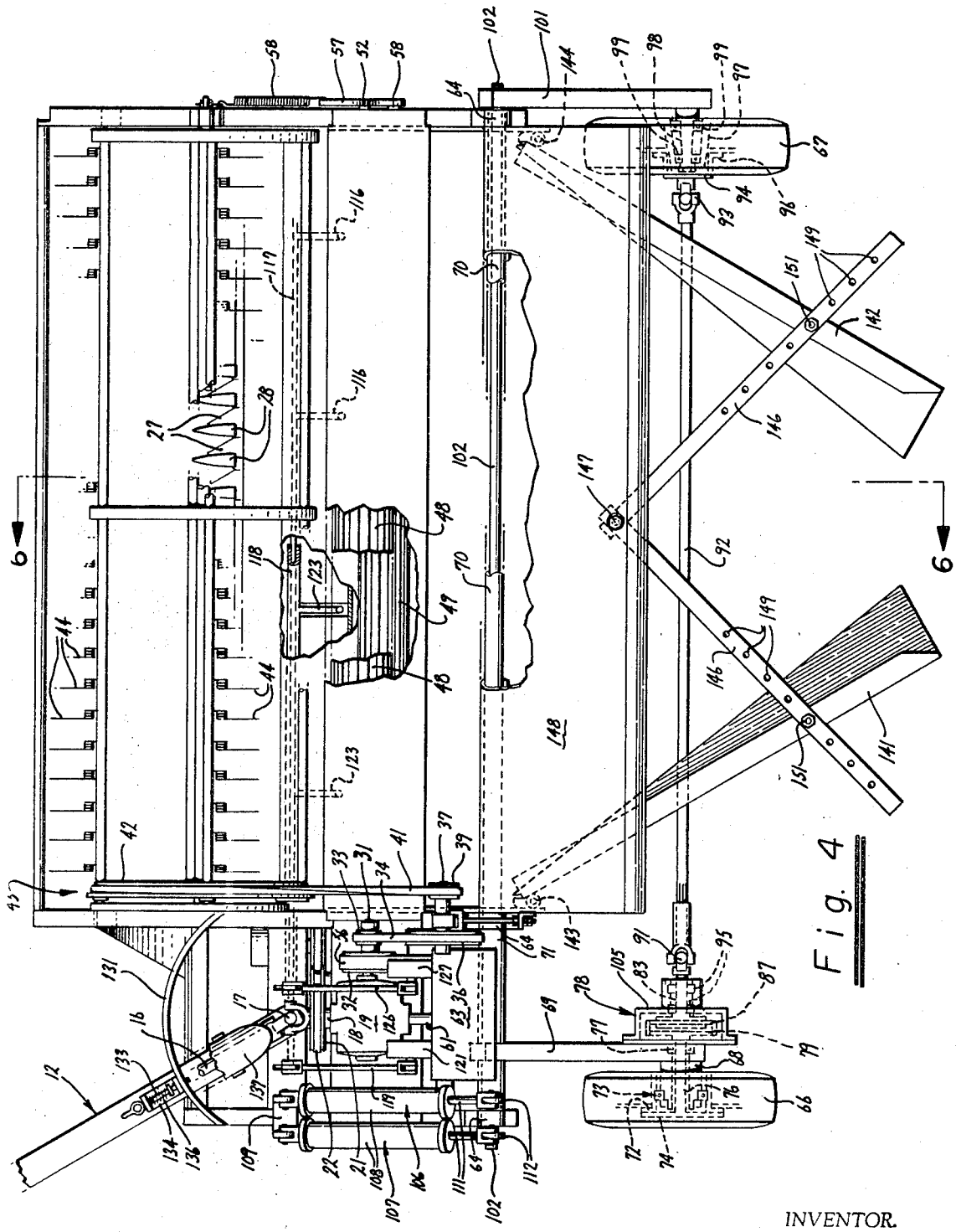
FIG. 4 is a top plan view of the apparatus shown in FIG. 1.

The apparatus for mowing, conditioning and windrowing consists of a framework 11. A draw bar 12 is mounted upon the framework which is adapted to be secured to suitable pulling vehicle such as a wheeled tractor 13 shown in broken lines in FIG. 1. A shaft 16 is mounted upon the framework 11 and is connected to the power takeoff of the tractor. The shaft 16 is connected to a universal joint 17 which is mounted on the input shaft 18 of a speed reducer unit 19 mounted on one end of the framework 11. A sheave 21 is mounted on the shaft 18 and drives a V-belt 22. The V-belt 22 extends downwardly and drives a sheave 23 mounted on a shaft 24. The shaft 24 forms part of a conventional sickle drive assembly 26. The sickle drive assembly causes reciprocatory movement of the sickle 27 in fixed guards 28.

The speed reducer 19 is provided with an output shaft 31 which carries a pair of sheaves 32 and 33. The sheave 33 drives a belt 34 which drives a large sheave 36 mounted upon a shaft 37. The shaft 37 is rotatably mounted in a bearing 38 mounted upon the framework 11 and drives a sheave 39 which drives a belt 41. The belt 41 drives a large sheave 42 mounted on one end of a reel assembly 43.

The reel assembly 43 is generally of a conventional type and is provided with four separate rows of tines 44 which are adapted to be extended at a certain point in the rotation of the reel assembly so as to move the plants which are to be cut into the sickle 27 during the time the sickle is being reciprcoated. As can be seen in FIG. 6, the tines 44 are fully extended during the time the reel is being rotated from the 3 o'clock position to the 6 o'clock position and are retracted as they are moved into the 9 o'clock position as shown in FIG. 6. The reel assembly 43 serves to sweep the forage which has been cut rearwardly up and over an inclined surface 46 provided on a headboard 47 which extends longitudinally of the framework 11 and is supported thereby. The forage is delivered to a pair of conditioning rolls 48 and 49 extending longitudinally of the framework 11 and rotatably mounted therein.

The conditioning rolls 48 and 49 are of a conventional type. For example, the conditioning roll 48 can be formed of metal whereas the conditioning roll 49 can be formed of a suitable resilient material such as rubber. A space 51 is provided between the headboard 47 and the rolls 48 and 49 permit rocks and the like to drop between the headboard 47 and the conditioning rolls. The conditioning rolls 48 and 49 have shafts 52 and 53 with sheaves 54 and 55 mounted thereon. The sheaves 54 and 55 are driven by a belt 56. The belt 56 is driven by the large sheaves 32 mounted on the shaft 31. The other end of shaft 52 is carried by a crank 57 that has one end pivoted at 58 on the framework 11. The other end is secured to a spring 59 also secured to the framework 11. If a rock should enter the rolls 48 and 49, the spring 59 will permit the upper roll 48 to be raised about the pivot 58 so that rock can pass through without breaking the rolls.

The speed reducer 19 is provided with another output shaft 61 which is connected to a hydraulic pump 62 mounted upon the framework 11 below a tank 63 for hydraulic fluid also mounted on the framework 11.

Means is provided for adjusting the height of the framework 11 relative to the ground and consists of a pair of rubber tired wheels 66 and 67. For reasons hereinafter described, the wheel 67 has a diameter slightly greater than the diameter of the wheel 66. The wheel 66 is mounted upon a hollow stub shaft 68 carried by support member 69 affixed to a tubular member 71 extending longitudinally of the framework 11 and mounted coaxially on a tubular member 70 affixed by brackets 64 to the framework 11. The wheel 66 is provided with a hub 72 which is rotatably mounted upon the hollow stub shaft 68 by a bearing assembly 73. A plate 74 is secured to the hub 72 and is connected to a solid shaft 76 which extends through the hollow stub shaft 68 and is rotatably mounted in a bearing 77 mounted in the support member 69. The shaft 76 is connected to a clutch assembly 78 mounted upon the support member 69. The clutch assembly includes a sprocket 79 which is secured to the shaft 76 by a set screw 81. The clutch assembly also includes a splined sleeve 82 which is keyed to a shaft 83 by a key 84. Shafts 76 and 83 are axially aligned and shaft 76 has an extension 76a which seats in a bore 85 of shaft 83. The sleeve 82 is also held in place by a set screw 86. A sprocket 87 is rotatably mounted on the sleeve 82 and is connected to sprocket 79 by an interlocking sprocket chain assembly 88. Sprocket 87 is adapted to be frictionally engaged by friction discs 89 carried by backing plates 90 splined on the sleeve 82. A "Belleville"-type spring 95 is mounted on the sleeve 82 and is retained by a collar portion 82a of the sleeve 82 and engages one of the locking plates 90. An adjustment plate 100 is threaded on the sleeve 82 and carries set screws 103 adapted to engage the other backing plate 90. A set screw 104 holds the adjustment plate 100 in the desired position. The clutch assembly 78 is mounted within a housing 105. The shaft 83 is rotatably mounted in a bearing 95 carried by the housing 105 and which is connected to a universal joint 91. A shaft 92 which has one end splined is mounted in the universal joint 91. The other end of the shaft 92 is connected to another universal joint 93. The universal joint 93 is connected to a plate 94 secured to a plate 96 which forms a part of the wheel 67. The wheel 67 is removably secured to a hub 97 which is rotatably mounted upon a stub shaft 98 by bearing 99. The stub shaft 98 is carried by a support member 101 affixed to a shaft 102 which is pivotally mounted within the tubular member 70.

Means is provided for rotating or pivoting the tubular member 71 and the shaft 102 independently of each other and consist of hydraulic actuators 106 and 107. Both include cylinders 108 which have one end pivotally connected to a U-shaped member 109 affixed to the framework 11 and both include piston rods 111 pivotally connected to the upper extremities of lever arms 112 which are affixed intermediate their ends to the tubular member 71 and the shaft 102. The lower extremities of the lever arms 112 are connected to a pair of springs 113 which are secured to the framework 11. The springs 113 serve to counter-balance the weight of the framework and the parts carried thereby.

Means is provided for controlling the supply of fluid to the hydraulic actuators 106 and 107 so that they properly position the framework 11 for the cutting operation and consist of a pair of ground sensing members 116 mounted upon a shaft 117 pivotally mounted in a tubular member 118 and connected to a linkage 119 which operates a hydraulic control valve 121. Similarly, an additional pair of ground sensing members 123 are secured to the tubular member 118. The tubular member 118 is connected by linkage 126 to a hydraulic control valve 127.

Means is provided for adjusting the angular position of the drawbar 12 with respect to the framework 11 and consists of a semi-circular or arcuate member 131 secured to the framework 11 and which is provided with a plurality of holes extending the length thereof which are adapted to be engaged by a pin 133 slidably carried by a U-shaped member 134 mounted upon the drawbar 12. The pin 133 is urged into an engaging position with the semi-circular member 131 by a spring 136 provided within a U-shaped member 134. A protective cover 137 is provided for the drive shaft 16. A cover plate 138 is mounted to the rear of the framework 11. A pair of windrowing shields 141 and 142 are pivotally mounted at 143 and 144 upon the framework 11. They are held in adjusted positions by bars 146 which are pivotally mounted by a bolt 147 on a cover plate 148 mounted on the tubular member 70. The bars 146 are provided with a plurality of holes 149 spaced longitudinally of the bars 146. Bolts 151 extend through the holes and are secured to the shields 141 and 142.

Operation and use of the apparatus may now be briefly described as follows:

Let it be assumed that it is desired to utilize the apparatus for making forage as, for example, the cutting of a field of alfalfa. The apparatus is connected to tractor 13 as shown in FIG. 1 with the drawbar inclined as shown so that the apparatus is positioned to the right of the tractor so that it is unnecessary for the tractor to travel over any of the alfalfa which is to be cut. The tractor is placed in operation with the power takeoff operating to cause operation of the apparatus including the sickle drive assembly 26, the reel assembly 43 and the conditioning rolls 48 and 49. As the apparatus is advanced, the reel tends to sweep the crop to be cut into the sickle assembly 26 so that it is cut cleanly and thence is swept upwardly to the rear over the header board 47 and into the conditioning rolls 48 and 49 which serve to condition to alfalfa by breaking the same up. The alfalfa emerges from the conditioning rolls and is guided by the windrowing shields 141 and 142 into a windrow 151 extending the rear of the machine. The windrow 151 can be shifted to the right or the left of the machine as desired to properly position the same so that it is unnecessary for the tractor to travel over the windrow during the cutting of the next swath.

During the operation of the apparatus, the apparatus will not cant sideways. This is because the wheel 67 has a diameter which is slightly greater than the wheel 66 so that during travel of the apparatus over a certain predetermined distance, the wheel 67 rotates slightly less than the wheel 66. Thus, for example, the wheel 67 could rotate ⅓ of a revolution less for each 100 feet of travel of the apparatus. This means that as the apparatus is advanced, there will be a tendency for the larger wheel 67 to push the right end of the apparatus forwardly as viewed in FIG. 1, so that the tendency to cant to the rear is overcome. The clutch assembly 78 is provided to permit a controlled slippage of the wheels 66 and 67 relative to each other after a predetermined force has been applied by movement of the wheels 66 and 67. Thus, the clutch assembly can be adjusted by positioning of the adjustment plate 100 and the screws 103 carried thereby so that the friction discs 89 will slip relative to sprocket 87 when a predetermined force is applied by the relative motion of the two wheels 66 and 67 so that it will not be necessary for one of the wheels to slip on the ground. By adjusting this force, the position of the right-hand side of the framework 11 can be readily controlled. This clutch assembly 78 also operates when the apparatus is pulled around corners to eliminate slippage of one of the wheels 66 or 67 on the ground.

It is apparent from the foregoing that there has been provided a new and improved apparatus for mowing, conditioning and the windrowing of forage. The height control is essentially automatic. There is no tendency for the apparatus to cant sideways as it is being pulled down the field by a tractor from one side of the same.

What is claimed is:

1. In an apparatus adapted to be towed behind a tractor, a framework, towing means secured to one end of the framework, a pair of spaced ground engaging wheels secured to said framework so that they are spaced transversely of the direction in which the framework is to be pulled, the wheel farthest from said towing means having a diameter slightly greater than the diameter of the other wheel, clutch means interconnecting the wheels and adapted to be adjusted to permit slippage upon a predetermined force being applied to the clutch means by said wheels to thereby maintain said framework in the desired position without canting.

2. Apparatus as in claim 1 for use in cutting forage together with mowing means carried by the framework, reels means positioned over the mowing means and a pair of rolls carried by the frame to the rear of the mowing means for receiving forage after it has been mowed by the mowing means.

3. Apparatus as in claim 1 wherein said wheels are interconnected by a shaft and clutch means secured to the shaft to restrain rotation of the wheels relative to each other.

4. Apparatus as in claim 2 together with means for sensing the contour of the ground and means controlled by the sensing means for raising and lowering the framework to properly position the mowing means relative to the ground.

5. Apparatus as in claim 4 wherein said sensing means is divided into at least two parts adapted to sense the position of the ground below with respect to spaced two points and means controlled by the sensing means for automatically positioning the framework relative to the ground.

References Cited
UNITED STATES PATENTS 2,615,294   10/1952   Dray _____ 56—218
2,963,303   12/1960   Young et al. _____ 280—412 X ANTONIO F. GUIDA, Primary Examiner U.S. Cl. X.R.
56—218; 280—473